United States Patent
Oakner et al.

(10) Patent No.: US 6,442,955 B1
(45) Date of Patent: Sep. 3, 2002

(54) CONDENSATE OVERFLOW SAFETY SWITCH

(76) Inventors: Stuart Peter Oakner, 22058 Flower Dr., Boca Raton, FL (US) 33428; Mark Thomas Brannick, 9151 Pine Springs Dr., Boca Raton, FL (US) 33428; Donna Ellen Oakner Brannick, 9151 Pine Springs Dr., Boca Raton, FL (US) 33428

( * ) Notice: Subject to any disclaimer, the term of this patent is extended or adjusted under 35 U.S.C. 154(b) by 0 days.

(21) Appl. No.: 09/861,551

(22) Filed: May 22, 2001

Related U.S. Application Data (63) Continuation-in-part of application No. 09/798,951, filed on Mar. 6, 2001.

(51) Int. Cl.$^7$ .......................... F25D 21/00; G08B 21/00
(52) U.S. Cl. .......................... 62/150; 340/616; 340/618
(58) Field of Search ....................... 62/150, 127, 284; 340/616, 620, 623, 618; 137/557, 558, 505.11, 527.6

(56) References Cited

U.S. PATENT DOCUMENTS

| | | |
|---|---|---|
| 4,392,128 A | 7/1983 | Young et al. |
| 4,937,559 A | 6/1990 | Meachum et al. |
| 5,028,910 A | 7/1991 | Meachum et al. |
| 5,069,042 A | 12/1991 | Stuchlik, III |
| 5,522,229 A | 6/1996 | Stuchlik, III et al. |
| 5,621,393 A | 4/1997 | Urich |
| 5,627,523 A * | 5/1997 | Besprozvanny et al. .... 340/623 |
| 5,699,049 A * | 12/1997 | Difiore ........................ 340/618 |
| 5,898,376 A * | 4/1999 | Webb ......................... 340/623 |
| 6,154,144 A | 9/2000 | Johnson |

OTHER PUBLICATIONS

Riko Co. Ltd. Products Guide Liquid Level Float Switches.

* cited by examiner

Primary Examiner—Chen-Wen Jiang
(74) Attorney, Agent, or Firm—Andrew F. Reish (57) ABSTRACT

A safety switch that can be used with an air handling system is disclosed. The air-cooling system includes a drain pan for collecting liquid condensed on the evaporator coils. The pan is fluidwise connected to a T- or L-shaped tubular structure, installable at any slope from horizontal to vertical, in which the switch is mounted and the switch is electrically connected to a circuit of the system, a power circuit or an alarm circuit. The switch has an annular float containing an annular magnet mounted about a tube in which is sealed a reed switch. The float ascends or descends based on the level of liquid within the tubular structure. Dependent upon a predetermined level of liquid within the tubular structure the float will move along the tube to open or close the reed switch to either disrupt operation of the air handling system or operate an alarm circuit.

30 Claims, 4 Drawing Sheets

CONDENSATE OVERFLOW SAFETY SWITCH

The present application is a continuation-in-part of U.S. patent application Ser. No. 09/798,951 filed Mar. 6, 2001.

BACKGROUND OF THE INVENTION

1. Field of the Invention

The present invention relates to electrical condensate overflow safety switches. It is particularly directed to a device having an electrical float switch for de-activating air handling units, namely, air conditioning and refrigeration units, and/or activating an alarm signal. The activating/de-activating actions occur in the event a condensate drain line occludes in order to prevent or warn of potential drain pan overflows that could cause water damage to a building structure. The present invention provides an easy-to-install system either as original equipment at the initial installation of the air-handling units or as a retrofit.

2. Descriptions of the Related Art

Many residential and commercial air conditioning and refrigeration units employ an evaporator coil to dehumidify and cool ambient air in dwellings, climate controlled storage spaces, workspaces, and the like. The evaporator coil is frequently located indoors, often above the occupied areas of the building that it serves. Since the coil is colder than the air being conditioned, it condenses water liquid continuously while in operation. This condensate water liquid is typically collected in a drain pan, usually positioned under the coil, with the drain pan having one or more outlet ports for attaching a drainpipe for outflow of the condensate. The condensate water liquid drains through one or more of these outlets and generally through a drainpipe out of away from the building. The drain pan, pan outlets and drainpipe, including any U-shaped trap, which may be provided to create a fluid seal between the-air on opposite sides of the trap, often become occluded by algae, mold, mildew, dirt, etc. This occlusion may result in pan overflows that can cause water damage to building ceilings, walls, flooring and associated building components, which necessitate costly repairs.

In recognition of damages resulting from overflow of liquid drain lines and containers, pre-existing efforts have been made to alert users of those drain lines and containers of potential-blockage or overflow situations.

U.S. Pat. No. 4,393,128, to Young et al. discloses a sewage back-up alarm unit for placement in an existing sewer line connecting a residence to a sewage collection system. It discloses electrical conductors extending into the interior of the connection element for detection of the rise of sewage into the unit whereby an alarm is emitted when the liquid rises to a level corresponding to sufficient voltage to complete the circuit and sound an alarm such that a human can initiate action to preclude sewage back up. The alarm system relies not only on metal strips subject to coating with sewage and corrosion from sewage contaminants which will reduce the accuracy of readings for initiating the alarm, but requires human intervention should a backup actually exist.

Figures 3, 4C:
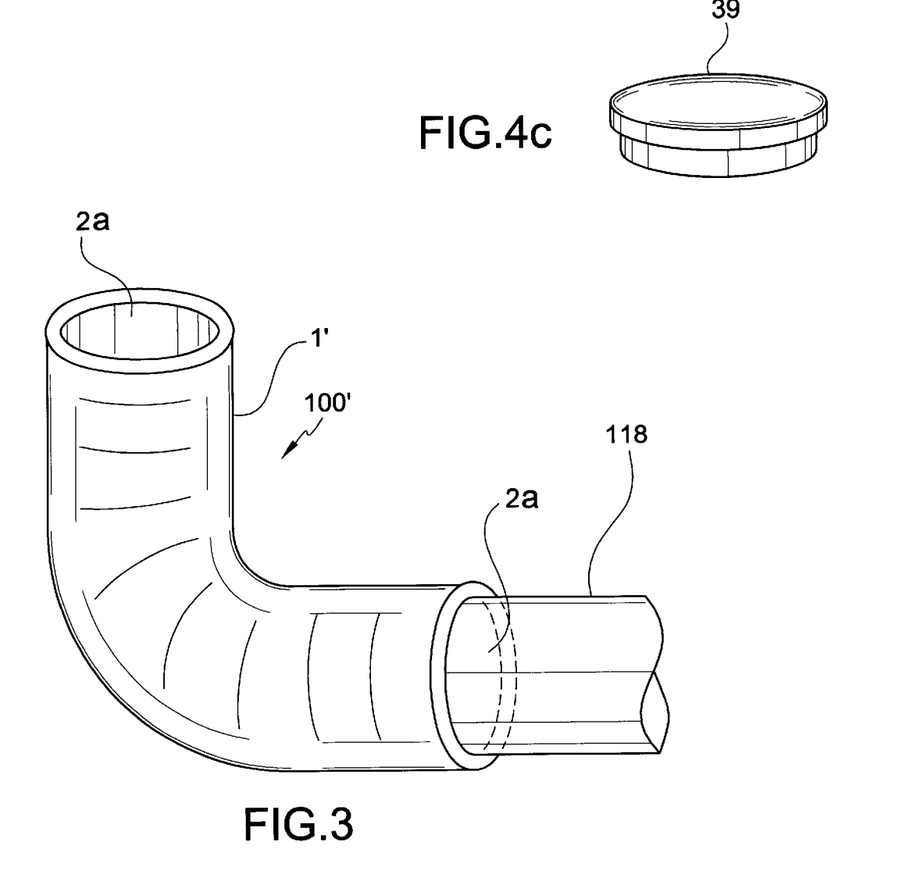
FIG. 3 is an isometric view of the L-shaped tubular structure of another embodiment of the condensate overflow safety switch of the present invention.
FIGS. 4a–4c are isometric views of the caps for the open ends of the tubular structure.

U.S. Pat. No. 4,937,559 to Meachum et al discloses an air conditioner drain blockage alarm having a float switch within which activates an alarm and a shut off circuit when a potential overflow event is detected. FIG. 3 reflects a float having an upper face contact 21 which upon upward movement by rising water liquid within switch housing, connects a pair of housing contacts on the lower face of the closed end of the switch housing, resulting in alarm activation and air handling unit de-activation. The housing is vented. The system does not recognize the ambient atmospheric as a corrosion source for the housing contacts, which reduces the reliability of the alarm and shut off.

U.S. Pat. No. 5,028,910 to Meachum et al discloses a drain overflow alarm for a washing machine drain. The device discloses a float disposed in a vertical drain line offset from the main washing machine drain line connected to the sewer, the float moving vertically upon liquid backup to interrupt the flow of electric current to the washing machine. The upper surface of the float has spaced float contacts that rise upward upon water back up to contact with fixed contacts on the downward facing inner, causing the interruption of the flow of electric current to the washing machine. While alluding that the float may be provided with an internal magnet so as to be able to act as part of a magnetic reed switch, no other elements were described in the alternative. Thus, as the system relies only on metal contacts subject to corrosion from sewage gases and contaminants as well as moisture, the combination of elements fails to recognize requirements of reliability to insure preclusion of overflow.

U.S. Pat. No. 5,069,042 to Stuchlik discloses a cleanable condensate U-shaped trap that can be used in the condensate drainage tubing of an air-cooling system. The condensate trap is designed so that any blockage existing in the trap can be easily detected and removed; for example, using a flexible brush that can be inserted through a U-shaped tube that forms part of the trap. A mechanical switching mechanism. including a float, is disclosed in a portion of the trap. The switching mechanism is arranged so that when liquid collects in the trap due to a blockage in the trap. or in the tubing located downstream of the trap; the float rises so as to cause a mechanical switch to shut off the air-cooling system and/or trigger an alarm. The metal linkage components and electrical contacts are exposed to ambient air. The system does not recognize the ambient atmospheric as a corrosion source for the linkage and contacts, which reduces the reliability of the shut off and the alarm.

U.S. Pat. No. 5,522,229 to Stuchlik discloses a blockade detector in the drain line of an air cooling system, the detector extending from a drain tube portion of the drain line into the air handler drain pan, to determine the presence of liquid at a certain level. A two prong liquid sensor probe is located at least partially in the drain tube, and includes a probe end that extends from the drain tube inlet end into the drain pan, when attached to the drain pan. The liquid sensor probe detects the undesired accumulation of liquid in the drain pan caused by a blockage in the drain pan, in the drain tube, or in any other portion of the drainage tubing. A control circuit generates an output signal when excess liquid is present at the probe end of the liquid sensor, so as to sound an alarm and/or turn off the air-cooling device. The drain tube is provided with an access port for a cleaning device to clean the drain pan outlet, the drain tube, and a U-shaped trap. The system relies on metal contacts exposed to contaminated liquid fostering corrosion that will reduce the accuracy of readings for initiating the alarm or interrupting the system.

U.S. Pat. No. 5,621,393 to Urich discloses a fill-level test and measuring device that serves as an overfilling prevention means for a liquids container, particularly to corrosive media containers; the device allowing remote-controlled monitoring of its operability by permitting lifting of the float without being supported by buoyancy. The float slides upward on a slide tube. either as a result of action by the individual monitor or due to rise of liquid level. There appears to be no indication of automatic intake cut-off upon reaching a certain predetermined fill level.

U.S. Pat. No. 6,154,144 to Johnson discloses an automatic shutoff overflow controller comprising a circuit which engages between a source of power and a water liquid processing device; the controller, sensing an undesirably high water liquid level in the device, shutting off the device and producing an audible warning that such condition exists.

OBJECT AND SUMMARY OF THE INVENTION

In order to design an effective condensate safety switch device for preventing structural damage to building components from condensate water liquid overflows; it is necessary to provide a system and/or a safety switch that senses condensate drain line occlusion and either 1) stops the generation of condensate liquid until the cause of the drain occlusion can be remedied, or 2) activates an alarm indicating the occurrence of such occlusion.

An object of the invention is creating a condensate overflow safety switch that is characterized by simple mechanical and electrical design, compactness, low manufacturing complexity, and high operational reliability.

Another object of the present invention is to provide a safety switch having compact switch means sealed from environmental contamination.

A further object of the present invention is to affect. in the situation where an occlusion has occurred in the drain line fluidwise connected to the drain pan, an interruption to operation of the air-cooling means; producing condensate in the drain pan, or activating an audible, visual or electronic alarm indicating the presence of such occlusion.

To achieve the foregoing and other objects, and to overcome the limitations set forth above, a condensate overflow safety switch is provided. The present invention includes a T-shaped or L-shaped (right angle or curved) tubular structure, which can be connected fluidwise to a drain pan. The tubular structure mounts a reliable float switch to detect the existence of a predetermined level of liquid therein, which correlates with the level of water liquid in the drain pan. Presuming that the correlation approximates 1:1 and that an occlusion exists such that the liquid in the drain pan cannot drain, the predetermined level is set below the lowest level at which liquid would overflow the low point of the upper edge of the pan, or out of an orifice which was not provided with a drain line.

The float switch comprises a hollow tube or rod containing a reed switch sealed therein with wires extending though the seal, the hollow tube being surrounded by an annular float body containing an annular magnet disposed between the longitudinal midpoint of the float body and one of the longitudinal ends of the float body; the float body being mounted about the tube such that it ascends to and descends from the predetermined level in response to the liquid level in the tubular structure. The reed switch includes contacts that are biased toward contact and can be connected to an electrical circuit of the air handler electrical control unit, preferably the thermostat electrical circuit, or to an alarm circuit. The float body is mounted about the tube with the magnet in the portion thereof facing toward the liquid and the reed switch is connected to an electrical circuit of the air handler electrical control unit. As the liquid causes it to ascend, as the magnet becomes orthogonally adjacent to the reed switch contacts; its magnetic field would cause the contacts to separate, which would open the circuit rendering inoperative the system producing the condensate collected in the drain pan. After the occlusion is cleared and resolved, the condensate will drain from the drain pan to reduce the liquid level in the drain pan and correspondingly reduce the liquid level in the tubular structure. With the decrease of the liquid in the tubular structure to a level below the predetermined level; the float switch will descend and the reed switch will close, allowing the system producing the condensate to operate.

On the other hand, when the reed switch is connected to an alarm circuit, the float body is mounted about the hollow tube with the magnet in the portion thereof in close proximity to the reed switch contacts, thereby causing the reed switch to open. As the condensate causes the float body to ascend past the reed switch until the condensate reaches a predetermined level, the magnetic field has reduced influence on the reeds of the reed switch. As a result, the reeds, which are biased to close, close thereby closing an electrical alarm circuit to activate an alarm notifying of a possible occlusion to condensate liquid draining from the drain pan. After any occlusion is cleared and resolved, the level of the liquid in the tubular structure will descend causing the float to descend with the resultant opening of the contacts of the reed switch thereby deactivating the alarm circuit.

The float switch is mounted within an opening of the tubular structure via a mounting cap that can be removed from the structure for maintenance and inspection. The hollow tube containing the reed switch and mounting the float body with annular magnet therein can be adjusted closer or farther from the mounting cap, enabling the float body to be positioned at various depths within the tubular structure. The inner and outer diameters of the openings of the tubular structure may vary in size. The closure caps and mounting cap of the tubular structure may vary in construction, shape and materials; the materials varying from a plastic (opaque, translucent or transparent), to metal. Likewise the size, shape, and material of the tubular T-shaped body or L-shaped body may vary similarly to those of the closure caps and mounting cap. In conclusion, the switch can be positioned in the primary condensate drain line, on the primary or any auxiliary drain line outlet on the primary drain pan, on the auxiliary drain pan outlet (when present), or in the auxiliary drain pan drain (when present).

The device of the T-shaped embodiment can be positioned at a slope from vertical to horizontal. facilitating installation in small spaces and drain lines that run at various angles. The L-shaped embodiment may be small in size, thereby facilitating positioning on outlets in small spaces and precludes the need for a plug on auxiliary drain outlets.

BRIEF DESCRIPTION OF THE DRAWINGS

The invention will be described in detail with reference to the following drawings in which like reference numerals refer to like elements and wherein.

DESCRIPTION OF THE PREFERRED EMBODIMENTS

Figure 1:
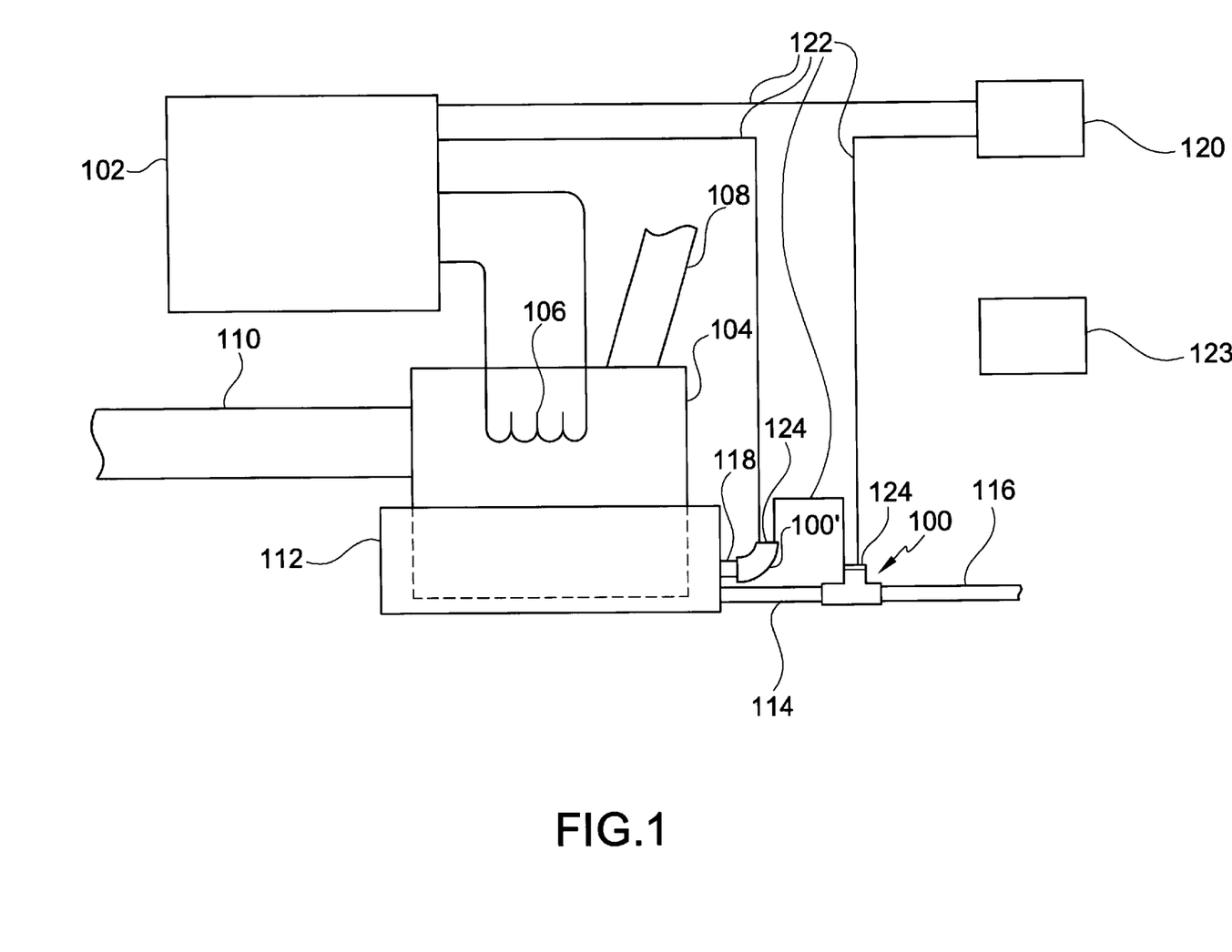
FIG. 1 is a diagrammatic view of an air-cooling system incorporating the condensate overflow safety switch of the present invention.

FIG. 1 illustrates an air-cooling system including a condensate overflow safety switch device 100 according to the present invention. The cooling system includes air-cooling means 102, which can be, for example, an air conditioning unit or other air-handling unit. The air-cooling means 102 is operatively associated with an air handler means 104 that includes heat exchange coils 106 which carry a cold material for cooling warm air conveyed to the air handler means 104 through duct 108. Cooled air is conveyed away from air handler means 104 through duct 110. As the air is cooled, liquid in the air condenses and is removed from the air to fall into a drain pan 112 from which it may outflow away from air handler means 104 through a primary drain pan outlet 114 via device 100 to a drain line 116, or it may outflow through secondary drain pan outlet 118. Air-cooling means 102 is controlled by, for example, a thermostat 120 that is electrically connected to air-cooling means 102 via a circuit 122. An embodiment of the present invention provides overflow switch assembly 124 operatively associated with device 100. Overflow switch assembly 124 opens circuit 122 when liquid in device 100 rises to a predetermined level due to clogging of device 100 and/or drain line 116. In this manner, air cooling means 102 is rendered inoperative when device 100 and/or drain line 116 is clogged, to prevent the production of any further condensation and thus prevent the overflow of liquid and the damage associated therewith. Likewise, another embodiment of the present invention comprises a device 100', which is attached to the secondary outlet 118, having overflow switch assembly 124 which similarly opens circuit 1124 when liquid in device 100' rises to a predetermined level to render air cooling means 102 inoperative. It is to be noted that device 100 and device 100' are interchangeable by methods known to one skilled in the art. While FIG. 1 shows the use of both device 100 and 101', either can be removed with circuit 122 being associated with the remaining device by methods known to one skilled in the art. Further, it is to be noted that rather than overflow switch assembly 124 de-activating circuit 122, each can alternatively activate an alarm circuit 123.

Figure 2:
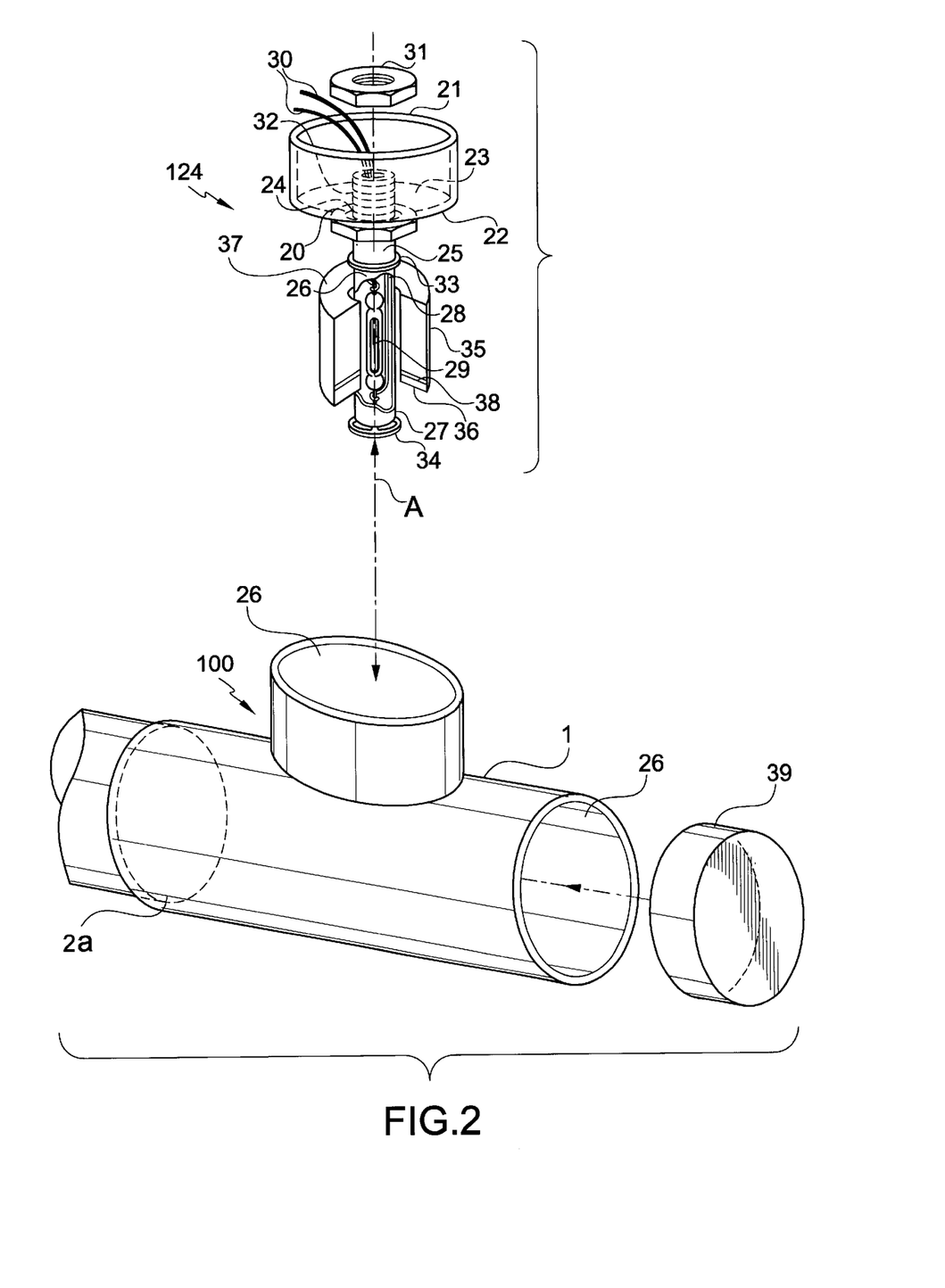
FIG. 2 is an exploded, isometric view of one embodiment of the condensate overflow safety switch of the present invention.

FIG. 2 shows a first embodiment of the condensate overflow safety device 100. Device 100 includes a T-shaped tubular structure 1 having first, second and third open ends 2a, 2b, and 2c. The first end 2a is attached to an outlet tubing 10 extending from drain pan 112 so as to be in connection fluidwise with the drain pan 112. Either of end 2b or end 2c receives an overflow switch assembly 124.

The overflow switch assembly 124 has the following described elements: A mounting cap 21 has an inner surface 22 and an outer surface 23 with an aperture 24 therebetween. A hollow tube 25 having an open end portion 26 and a closed end portion 27 with a stepped outer surface 28 extending therebetween. A reed switch 29 having longitudinally disposed electrical contacts and connecting insulating wires 30 is disposed within the hollow tube 25. A sealing material 31, for example plastic or epoxy, isolates and disposes the reed switch 29 within the hollow tube 25, the wires 30 extending therethrough for connecting to circuit 122 or an alarm circuit 123. The open end portion 26 is received into the aperture 24 for attachment to the mounting cap 21 by a depth attachment means 31, in this case by a nut engageable to threads 32 on the surface 28. (However, is within the scope of the invention that the depth attachment means 31 may be comprised of any known means of affixing the hollow tube 25 to the mounting cap 21.) An upper arcuate stopper mechanism 33 is engaged onto the hollow tube inward from the inner surface 22. And a removable arcuate stopper mechanism 34 is engaged onto the surface 28 of the hollow tube 25, adjacent the closed end portion 27. An annular float body 35 having a first end face 36 and a second end face 37 is mounted for slidable movement along the hollow tube 25 containing the reed switch 29. Within the float body 35, an annular magnet 38 is disposed closer to first end face 36 than to second end face 37. When the wires 36 are connected to circuit 122 the float body is mounted with the first end face 36 facing toward arcuate stopper mechanism 34. When the wires 36 are connected to alarm circuit 123, the float body 35 is mounted with the second end face 37 facing toward stopper mechanism 34.

A closure cap 39 is insertable and attachable by known means, for example, friction fit or adhesive, within any of the first, second, and third open ends 2a, 2b, and 2c, which does not otherwise receive drain tubing, drain line, drain outlet, or mounting cap 21. The mounting cap 21 and the closure cap 39 may be of similar design, though in its preferred embodiment, the counting cap 21 has an aperture 24 therein, whereas closure cap 39 would not necessarily have such an aperture.

FIG. 3 shows a second embodiment of the condensate overflow safety switch 100'. Switch 100' includes an L-shaped tubular structure 1' having first and second open ends 2a and 2b. The first end 2a is attached to an outlet tubing 118 extending from drain pan 112 so as to be in connection fluidwise with the drain pan 112. The overflow switch assembly 124 and mounting cap 21 are common to those shown in the embodiment of FIG. 2 and, thus their description is incorporated herein by reference.

Figure 4A:
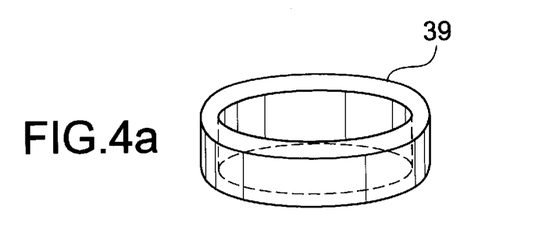
Figure 4B:
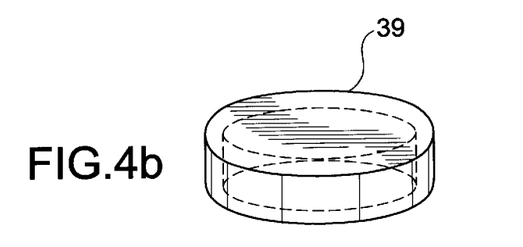

FIGS. 4a, 4b, and 4c show three examples of the closure cap 39. FIG. 4a shows a cup-shaped cap 39 to fit within an open end of the tubular structure 1. FIG. 4b shows a mounting cap 39 shaped to fit over the lip of and surround an open end of the tubular structure 1. FIG. 4c shows a mounting cap 39 designed to fit within an open end of the tubular structure 1.

As to the above-described elements shown in FIGS. 2, 3, and 4a–4c, with the exception of the reed switch 29, wires 30, stopper mechanism 33 and 34 and annular magnet 38, which normally require metal content for optimizing performance, the elements can be made of metal, plastic, PVC or other comparable material. However, of course. the overall construction of the float body must insure buoyancy thereof. Regarding the plastic material it can be transparent, translucent or opaque.

As to the dimensions of the elements above-described and shown in FIGS. 2, 3 and 4a–4c, they may vary as required by the circumstances of the environment in which they are applied. However, in usual circumstances, the T-shaped tubular structure 1 and the L-shaped tubular structure 1' may measure 3 to 4 inches in length. The T-shaped tubular structure 1 is from 2 to 3 inches from the open end 2b to the opposite bottom. The segments that form the T-shaped body may vary in internal or external diameter, but are generally from ½ to 3 inches in diameter. The inner and outer surface of the segments that form the tubular body may vary in shape to aid in engaging the float assembly and to affixing to the switch mounting cap, to an end closure cap to the drain line, or to the drain pan outlet.

Figure 5A:
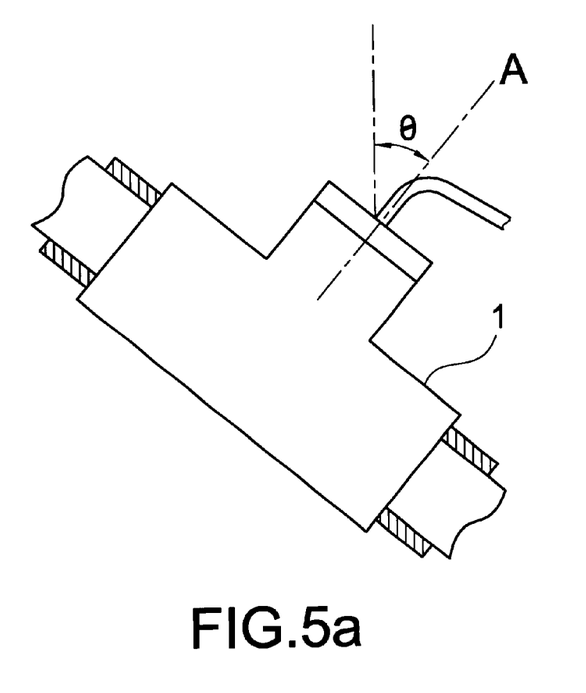
FIGS. 5a–5b are schematic views of the overflow switch mounted in the T-shaped and L-shaped tubular structure, respectively.
Figure 5B:
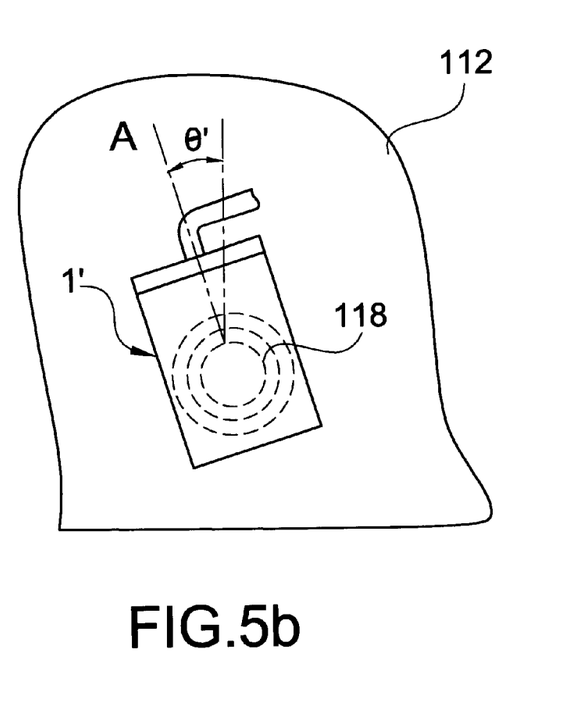

In operation, with respect to the embodiments of device 100 or device 100' attached in fluidwise connection to an outlet of the drain pan 112, when either device or the drain line. 116 clogs, the condensate liquid in the drain pipe, drain line, or drain pan backs up; causing a float body 35 inside either device 100 (T-shaped body) or device 100' (L-shaped body) to ascend; causing either 1) the reed switch 30 to open the circuit 122, preferably the thermostat circuit, thereby shutting off the refrigerant circulation in the air cooling means 102, retarding the generation of additional condensate water liquid, and hindering overflow from the drain pan 122, or 2) the reed switch 30 to close the circuit 123, thereby causing an alarm to signal the existence of a potential overflow situation. Additionally, in use, when the mounting cap 21 and assembly 124 are mounted on the device 100, the device 100 can be inclined such that the central axis A of the hollow tube 25 can be disposed at an angle Θ up to substantially 45 degrees from the vertical while maintaining continued operability (FIG. 5a). Likewise, when the mounting cap 21 and assembly 124 are mounted on device 100', the central axis A of the hollow tube 25 can be disposed at an angle Θ' up to substantially 20 degrees to the vertical while maintaining continued operability (FIG. 5b).

In the invention being thus described it will be obvious that the same may be varied in many ways. Such variations are not to be regarded as the departure from the spirit and scope of the invention, and all such modifications as would be obvious to one skilled in the art; such as variations in dimension and shape, intended to be included within the scope of the above description.

What is claimed is:

1. An air-cooling system comprising:
   means for cooling air;
   at least one of a first circuit connected to means for controlling supply of power to said means for cooling air or a second circuit connected to an alarm circuit;
   air handling means for cooling warm air, said air handling means having heat exchanger coils for containing a cold material for cooling the warm air;
   a drain pan for receiving condensate liquid formed on said exchanger coils, said drain pan having at least one outlet; and
   tube means fluidwise connected to said at least one outlet for conveying liquid away from said drain pan, said tube means including:
      a safety switch device having a tubular structure, said tubular structure having a plurality of open ends, a first open end of said plurality of open ends being fluidwise connected to one of said at least one outlet, and an overflow switch assembly mounted within a second open end of said plurality of open ends, said overflow switch assembly including:
         a magnetically driven reed switch, said reed switch having sealed contacts, each of said contacts being electrically connected by at least one electrical connection to one of said first circuit and said second circuit;
         a mounting cap for mounting said reed switch within said second open end, said mounting cap having an outer face, and inner face, and an aperture therebetween;
         a hollow tube having a closed end portion, an open end portion, and an outer surface extending therebetween, said hollow tube being disposed through said aperture, a stop means affixed to said closed end portion, and sealing means for sealingly closing said open end portion with said reed switch therein and said electrical connections extending through said sealing means; and
         attachment means for adjustably attaching said open end portion adjacent to said outer face.

2. The system according to claim 1, wherein said overflow switch assembly further includes:
   a buoyant annular float body moveable along said outer surface between said stop means and a predetermined level toward said inner face, said annular float body having an annular magnet disposed therein for magnetically driving said contacts.

3. The system according to claim 2, wherein said annular float body has a first face end and a second face end, and said annular magnet is disposed closer to said first face end than said second face end.

4. The system according to claim 3, wherein said contacts are biased to closed, said contacts are electrically connected to said first circuit, and said first face end faces away from said inner face for floating upon the condensate liquid within said tubular structure and for movement to the predetermined level upon a rise in the level of the condensate liquid, whereby rising condensate liquid within said tubular structure causes said annular float body to rise toward the predetermined level.

5. The system according to claim 4, wherein the predetermined level is the level whereat said annular magnet drives said contacts to seperate.

6. The system according to claim 4, wherein said tubular structure is a T-shaped structure.

7. The system according to claim 3, wherein said contacts are biased to closed, said contacts are electrically connected to said circuit, and said second face end faces away from said inner face for floating upon the the condensate liquid within said tubular structure and for movement to the predetermined level upon a rise in the level of the condensate liquid, whereby rising condensate liquid said tubular structure causes said annular float body to rise toward the predetermined level.

8. the system according to claim 7, wherein the predetermined level is the level whereat said annular magnet drives said contacts to close.

9. The system according to claim 7, wherein said tubular structure is an L-shaped structure.

10. An overflow safety switch device comprising:
    a tubular structure for receiving and monitoring liquid draining from a drain pan, said structure having a plurality of open ends, a first open end of said plurality of open ends being fluidwise connected to the drain pan;
    an overflow switch assembly mounted in a second open end of said plurality of open ends, said overflow switch assembly including:
       a magnetically driven reed switch, said reed switch having sealed contacts, each of said contacts having at least one electrical connection to one of a first circuit for de-activating production of the liquid and a second circuit for activating an alarm;
       a mounting cap for mounting said reed switch within said second open end, said mounting cap having an outer face, an inner face and an aperture therebetween;
       a hollow tube having a closed end portion, an open end portion, and an outer surface extending therebetween, said hollow tube being disposed through said aperture, a stop means affixed to said closed end portion, and sealing means for sealingly closing said open end portion with said reed switch within said hollow tube and said electrical connections extending through said sealing means; and
       attachment means for adjustably attaching said open end portion adjacent to said outer face.

11. The switch device according to claim 10, wherein, said overflow switch assembly further includes:
  a buoyant annular float body moveable along said outer surface between said stop means and a predetermined level toward said inner face, said annular float body having an annular magnet disposed therein for magnetically driving said contacts.

12. The switch device according to claim 11, wherein said annular float body has a first face end and a second face end, and said annular magnet is disposed closer to said first face end than said second face end.

13. The switch device according to claim 12, wherein said contacts are biased to closed, said contacts are for electrical connection to said first circuit, and said first face end faces away from said inner face for floating upon the liquid within said tubular structure and for movement to the predetermined level upon a rise in the level of liquid, whereby rising liquid within said tubular structure causes said annular float body to rise toward the predetermined level.

14. The switch device according to claim 13, wherein the predetermined level is the level whereat said annular magnet drives said contacts to separate.

15. The switch device according to claim 12, wherein said contacts are biased to closed, said contacts are for electrical connection to said second circuit, and said second face end faces away from said inner face for floating upon the liquid within said tubular structure and for movement to the predetermined level upon a rise in the level of liquid, whereby rising liquid within said tubular structure causes said annular float body to rise toward the predetermined level.

16. The switch device according to claim 15, wherein the predetermined level is the level whereat said annular magnet drives said contacts to close.

17. The switch device according to claim 10, wherein said tubular structure is one of a T-shaped structure or an L-shaped structure.

18. A method for preventing condensate liquid overflow from a drain pan receiving condensate liquid from an air handling unit comprising the steps of:
  installing a tube means fluidwise connected to an outlet for conveying condensate liquid away from the drain pan, said tube means including:
    a safety switch device having a tubular structure, said tubular having a plurality of open ends, a first open end of said plurality of open ends being fluidwise connected to the outlet; and
    an overflow switch assembly mounted within a second open end of said plurality of open ends; said assembly including:
      a magnetically driven reed switch, said reed switch including sealed contacts biased to closed, each of said contacts having at least one electrical connection to a circuit connected to means for controlling supply of power to the air handling unit;
      a mounting cap for mounting said reed switch within said second open end, said mounting cap having an outer face, an inner face and an aperture therebetween;
      a hollow tube having a closed end portion, an open end portion, an outer surface extending therebetween, and a stop means affixed to said closed end portion, said hollow tube being disposed through said aperture, and sealing means for sealingly closing said open end portion with said reed switch within said hollow tube and said electrical connections extending therethrough;
      attachment means for adjustably attaching said open end portion adjacent to said outer face; and
      a buoyant annular float body moveable along said outer surface between said stop means and a predetermined level toward said inner face, said float body having a first face end and a second face end and an annular magnet disposed therebetween for magnetically driving said contacts, said annular magnet being disposed closer to said first face end than said second face end, and
  electrically connecting said electrical connection into said circuit.

19. The method according to claim 18, wherein the tubular structure is T-shaped and the installing step includes inclining the central axis of said hollow tube at an angle between 0 and 45 degrees to vertical.

20. The method according to claims 18, wherein the tubular structure is L-shaped and the installing step includes inclining the central axis of said hollow tube at an angle between 0 and 20 degrees to vertical.

21. A method for alarming of potential condensate liquid overflow from a drain pan receiving condensate liquid from an air handling unit comprising the steps of:
  installing a tube means fluidwise connected to an outlet for conveying condensate liquid away from the drain pan, said tube means including:
    a safety switch device having a tubular structure, said tubular having a plurality of open ends, a first open end of said plurality of open ends being fluidwise connected to the outlet, and an overflow switch assembly mounted within a second open end of said plurality of open ends; said assembly including:
      a magnetically driven reed switch, said reed switch including sealed contacts biased to closed, each of said contacts having at least one electrical connection to a circuit connected to means for signaling an alarm;
      a mounting cap for mounting said reed switch within said second open end, said mounting cap having an outer face, an inner face and an aperture therebetween;
      a hollow tube having a closed end portion, an open end portion, an outer surface extending therebetween, and a stop means affixed to said closed end portion, said hollow tube being disposed through said aperture, and sealing means for sealingly closing said open end portion with said reed switch within said hollow tube and said electrical connections extending therethrough;
      attachment means for adjustably attaching said open end portion adjacent to said outer face; and
      a buoyant annular float body moveable along said outer surface between said stop means and a predetermined level toward said inner face, said float body having a first face end and a second face end and an annular magnet disposed therebetween for magnetically driving said contacts, said annular magnet being disposed closer to said first face end than said second face end, and
  electrically connecting said electrical connections into said circuit.

22. The method according to claim 21, wherein the tubular structure is T-shaped and the installing step includes inclining the central axis of said hollow tube at an angle between 0 and 45 degrees to vertical.

23. The method according to claim 21, wherein the tubular structure is L-shaped and the installing step includes inclining the central axis of said hollow tube at an angle between 0 and 20 degrees to vertical.

24. A method for preventing condensate liquid overflow from a drain pan receiving condensate liquid from an air handling unit comprising the steps of:

installing a tube means fluidwise connected to an outlet for conveying condensate liquid away from the drain pan, said tube means including:

a safety switch device having a T-shaped tubular structure formed from one of the group of plastic and metal, said tubular structure having a first open end, a second open end and a third open end, said first open end and said second open end being opposite one another; and an overflow switch assembly mounted within one of said first open end and said third open end; said assembly including:

an electrical switch having electrical contacts, each of said contacts having at least one electrical connection to at least one circuit of the group of a circuit for controlling supply of power to the air handling unit and an alarm circuit;

a mounting cap for mounting said switch within one of said first open end and said third open end, said mounting cap having an outer face, an inner face and an aperture therebetween;

a rod having a first end portion and a second end portion, said rod being disposed through said aperture such that said first end portion extends beyond said outer face;

attachment means for attaching said first end portion adjacent to said outer face; and a buoyant float body suspended at said second end portion, said float body being moveable to a predetermined level from said inner face; and electrically connecting said at least one electrical connections of each of said contacts to at least one of said circuits.

25. The method according to claim 24, wherein the installing step includes mounting said tubular structure such that said first open end is elevated vertically above said second open end, mounting said assembly within said first open end, and fluidwise connecting said third open end to the outlet.

26. The method according to claim 25, wherein the installing step further includes inclining said tubular structure such that the central axis of said rod inclines at an angle between 0 and 45 degrees to vertical.

27. The method according to claim 24, wherein the installing step further includes mounting said assembly within said third open end and fluidwise connecting one of said first open and said second open end to the outlet.

28. the method according to claim 27, wherein installing step further includes inclining said tubular structure such that the central axis of said rod inclines at an angle between 0 and 45 degrees to vertical.

29. A method for preventing condensate liquid overflow from a drain pan receiving condensate liquid from an air handling unit comprising the steps of:

installing a tube means fluidwise connected to an outlet for conveying condensate liquid away from the drain pan, said tube means including:

a safety switch device having a L-shaped tubular structure formed from one of the group of plastic and metal, said tubular structure having a first open end and a second open end; and an overflow switch assembly mounted within one of said first open end and said second open end; said assembly including:

an electrical switch, said switch having electrical contacts, each of said contacts having at least one electrical connection to at least one circuit of the group of a circuit for controlling supply of power to the air handling unit and an alarm circuit;

a mounting cap for mounting said switch within one of said first open end and said second open end, said mounting cap having an outer face, an inner face and an aperture therebetween;

a rod having a first end portion and a second end portion, said rod being disposed through said aperture such that said first end portion extends beyond said outer face;

attachment means for attaching said first end portion adjacent to said outer face; and a buoyant float body suspended at said second end portion, said float body being moveable to a predetermined level from said inner face; and electrically connecting said at least one electrical connection of each of said contacts to at least one of said circuits.

30. The method according to claim 29, wherein the installing step further includes inclining said tubular structure such that the central axis of said rod inclines at an angle between 0 and 20 degrees to vertical.

* * * * *